(12) United States Patent
Shibata

(10) Patent No.: US 11,863,870 B2
(45) Date of Patent: Jan. 2, 2024

(54) IMAGE STABILIZATION APPARATUS AND METHOD OF CONTROLLING THE SAME

(71) Applicant: CANON KABUSHIKI KAISHA, Tokyo (JP)

(72) Inventor: Nobuhiro Shibata, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/939,082

(22) Filed: Sep. 7, 2022

(65) Prior Publication Data
US 2023/0090592 A1    Mar. 23, 2023

(30) Foreign Application Priority Data

Sep. 10, 2021  (JP) ................................. 2021-148081

(51) Int. Cl.
  *H04N 23/68*    (2023.01)
  *H04N 23/667*    (2023.01)

(52) U.S. Cl.
  CPC ......... *H04N 23/687* (2023.01); *H04N 23/667* (2023.01); *H04N 23/6812* (2023.01)

(58) Field of Classification Search
  CPC . H04N 23/667; H04N 23/687; H04N 23/6812
  USPC ................................................. 348/208.2
  See application file for complete search history.

(56) References Cited

U.S. PATENT DOCUMENTS

| | | | | |
|---|---|---|---|---|
| 7,522,188 B2* | 4/2009 | Tomita | ................... | H04N 23/68 348/208.1 |
| 7,932,926 B2* | 4/2011 | Tomita | ................... | H04N 23/68 348/208.4 |
| 8,259,183 B2* | 9/2012 | Tomita | ............... | H04N 23/6812 348/208.4 |
| 8,279,290 B2* | 10/2012 | Yamanaka | ........... | G02B 27/646 348/208.1 |
| 10,326,938 B2* | 6/2019 | Kajimura | ........... | H04N 23/6812 |
| 10,750,166 B2* | 8/2020 | Kakita | ..................... | H04N 5/28 |
| 2005/0270380 A1* | 12/2005 | Tomita | ................... | H04N 23/68 348/208.99 |
| 2010/0033583 A1* | 2/2010 | Tomita | ............... | H04N 23/6811 348/208.5 |
| 2011/0169973 A1* | 7/2011 | Tomita | ................. | H04N 23/687 348/208.7 |

(Continued)

FOREIGN PATENT DOCUMENTS

JP    05-66451 A    3/1993

*Primary Examiner* — Pritham D Prabhakher
(74) *Attorney, Agent, or Firm* — Cowan, Liebowitz & Latman, P.C.

(57) ABSTRACT

An image stabilization apparatus that reduces image blurring by moving a correction mechanism in accordance with a motion of an image capture apparatus is disclosed. The apparatus controls a movement of the correction mechanism in accordance with a target position of the correction mechanism, the target position being intended to reduce the image blurring. The apparatus detects a vibration of a preset frequency included in the motion, the preset frequency being higher than a first frequency of a vibration caused by a camera shake. The apparatus, in a case where the vibration of the preset frequency has been detected, further reduces a control gain used for controlling the movement of the correction mechanism compared to a case where the vibration of the preset frequency has not been detected.

14 Claims, 7 Drawing Sheets

(56) References Cited

U.S. PATENT DOCUMENTS

| | | | | |
|---|---|---|---|---|
| 2016/0316123 A1* | 10/2016 | Wakamatsu | ............ | G06T 7/246 |
| 2020/0154051 A1* | 5/2020 | Takeuchi | ............. | H04N 23/683 |
| 2021/0185231 A1* | 6/2021 | Narita | ................. | H04N 23/667 |
| 2021/0337127 A1* | 10/2021 | Uesugi | ................. | H04N 23/663 |

* cited by examiner

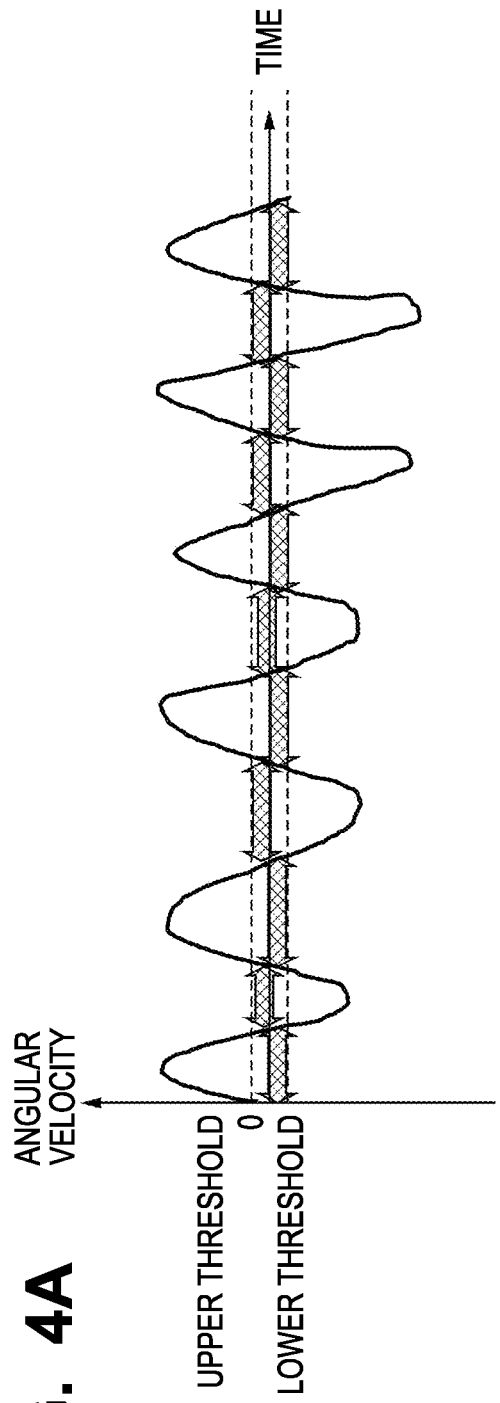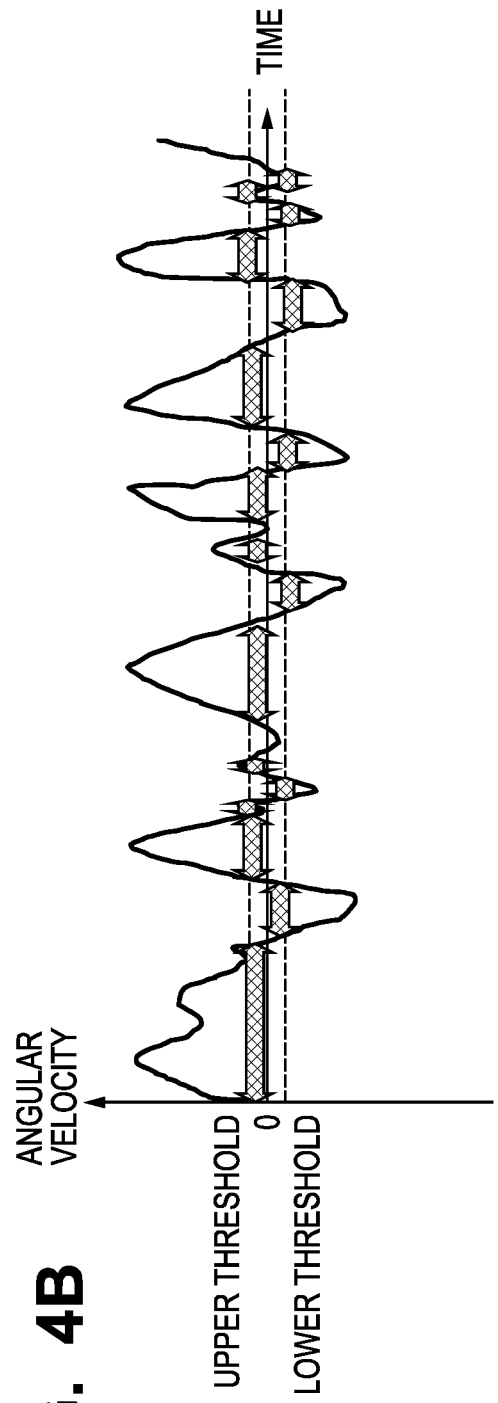

F I G. 6
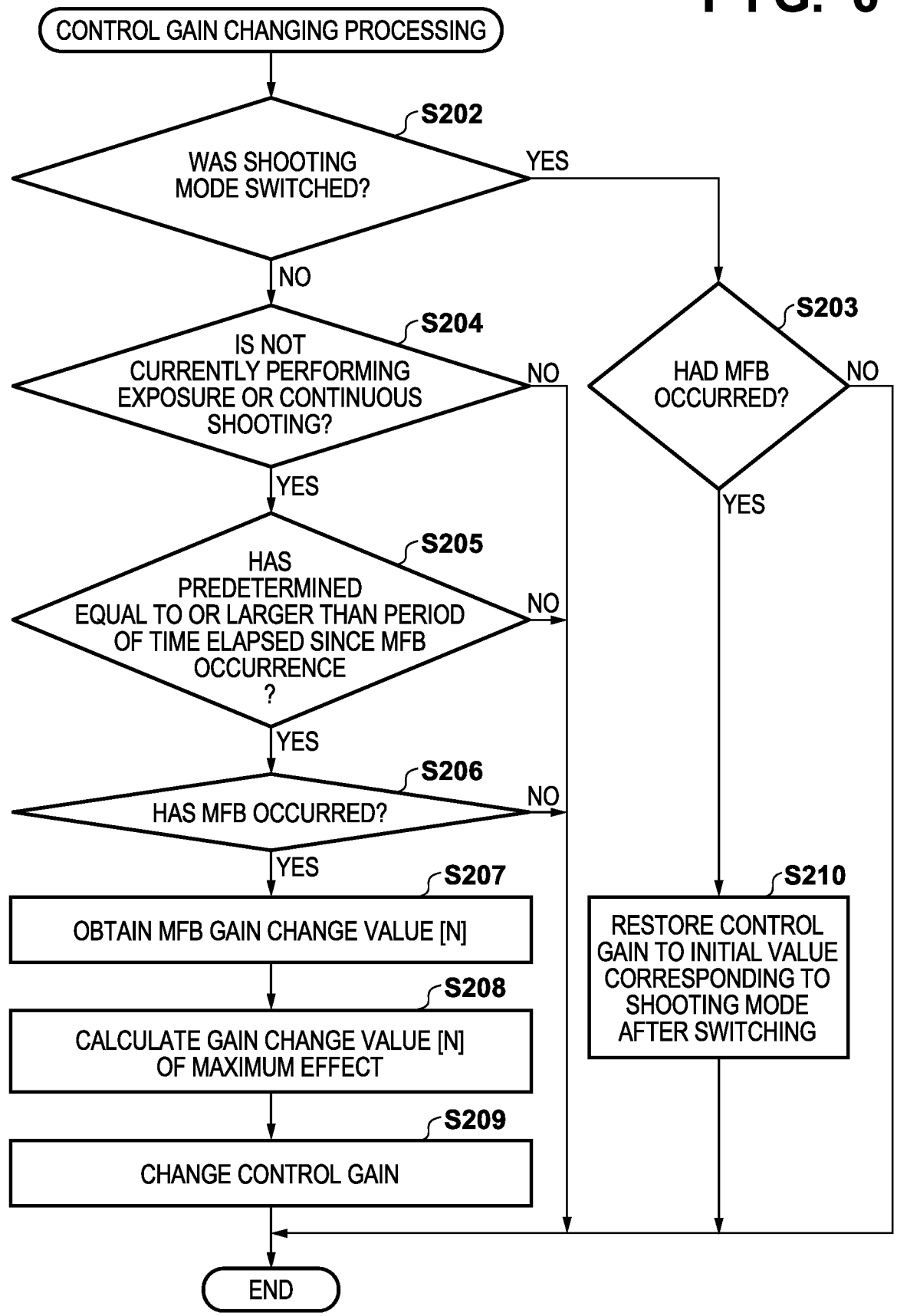

IMAGE STABILIZATION APPARATUS AND METHOD OF CONTROLLING THE SAME

BACKGROUND OF THE INVENTION

Field of the Invention

The present invention relates to an image stabilization apparatus and a method of controlling the same.

Description of the Related Art

An image stabilization apparatus is known that reduces image blurring by driving a correction mechanism (e.g., at least one of a correction lens and an image sensor) so as to cancel out the motion of an image capture apparatus during exposure. As described in Japanese Patent Laid-Open No. 5-66451, the image stabilization apparatus improves the accuracy of reduction of image blurring by performing feedback control on detection of the motion of the image capture apparatus and on driving of the correction mechanism.

In a case where there is a member that is mechanically coupled to a housing of the image capture apparatus, a minute vibration of the image capture apparatus caused by the reaction of driving of the correction mechanism may be amplified by that member. Typical examples of the member that could possibly amplify the minute vibration include a movable member that is coupled to the housing of the image capture apparatus via an arm or a hinge, an external accessory attached to a hot shoe, a specific lens unit (e.g., an interchangeable lens that has a total length and/or a weight equal to or larger than a threshold(s)), and so on.

Amplification of the minute vibration could possibly lead to the occurrence of a phenomenon where detection of the motion of the image capture apparatus and driving of the correction mechanism to cancel out the detected motion are repeated (hereinafter referred to as mechanical feedback (MFB)). The occurrence of MFB may cause the image capture apparatus vibrate continuously. MFB differs from the oscillation phenomenon of feedback control described in Japanese Patent Laid-Open No. 5-66451 in that MFB can occur even when feedback control is stable, and in that MFB does not occur if the vibration detection is stopped. Furthermore, conventionally, techniques to reduce MFB have not been proposed.

SUMMARY OF THE INVENTION

The present invention, in one aspect thereof, provides an image stabilization apparatus and a method of controlling the same that are capable of detecting the occurrence of a phenomenon where detection of the motion of an image capture apparatus and driving of a correction mechanism continue, and reducing the influence of this phenomenon.

According to an aspect of the present invention, there is provided an image stabilization apparatus that reduces image blurring by moving a correction mechanism in accordance with a motion of an image capture apparatus, the image stabilization apparatus comprising one or more processors that execute a program and thereby function as: a control unit configured to control a movement of the correction mechanism in accordance with a target position of the correction mechanism, the target position being intended to reduce the image blurring; a detection unit configured to detect a vibration of a preset frequency included in the motion, the preset frequency being higher than a first frequency of a vibration caused by a camera shake; and a changing unit configured to, in a case where the vibration of the preset frequency has been detected, reduce a control gain used for controlling the movement of the correction mechanism compared to a case where the vibration of the preset frequency has not been detected.

According to another aspect of the present invention, there is provided An image capture apparatus, comprising an image stabilization apparatus that reduces image blurring by moving a correction mechanism in accordance with a motion of an image capture apparatus, the image stabilization apparatus comprising: one or more processors that execute a program and thereby function as: a control unit configured to control a movement of the correction mechanism in accordance with a target position of the correction mechanism, the target position being intended to reduce the image blurring; a detection unit configured to detect a vibration of a preset frequency included in the motion, the preset frequency being higher than a first frequency of a vibration caused by a camera shake; and a changing unit configured to, in a case where the vibration of the preset frequency has been detected, reduce a control gain used for controlling the movement of the correction mechanism compared to a case where the vibration of the preset frequency has not been detected.

According to a further aspect of the present invention, there is provided a method of controlling an image stabilization apparatus that reduces image blurring by moving a correction mechanism in accordance with a motion of an image capture apparatus, the method comprising: controlling a movement of the correction mechanism in accordance with a target position of the correction mechanism, the target position being intended to reduce the image blurring; detecting a vibration of a preset frequency included in the motion, the preset frequency being higher than a first frequency of a vibration caused by a camera shake; and in a case where the vibration of the preset frequency has been detected, reducing a control gain used for controlling the movement of the correction mechanism compared to a case where the vibration of the preset frequency has not been detected.

According to another aspect of the present invention, there is provided a non-transitory computer-readable medium storing therein a program for causing a computer in an image stabilization apparatus that reduces image blurring by moving a correction mechanism in accordance with a motion of an image capture apparatus, to function as: a control unit configured to control a movement of the correction mechanism in accordance with a target position of the correction mechanism, the target position being intended to reduce the image blurring; a detection unit configured to detect a vibration of a preset frequency included in the motion, the preset frequency being higher than a first frequency of a vibration caused by a camera shake; and a changing unit configured to, in a case where the vibration of the preset frequency has been detected, reduce a control gain used for controlling the movement of the correction mechanism compared to a case where the vibration of the preset frequency has not been detected.

Further features of the present invention will become apparent from the following description of exemplary embodiments (with reference to the attached drawings).

BRIEF DESCRIPTION OF THE DRAWINGS

FIGS. 4A and 4B are diagrams for describing a method of detecting the frequency of mechanical feedback.

FIG. 6 is a flowchart related to the details of control gain changing processing according to the embodiment.

DESCRIPTION OF THE EMBODIMENTS

Figure 1:
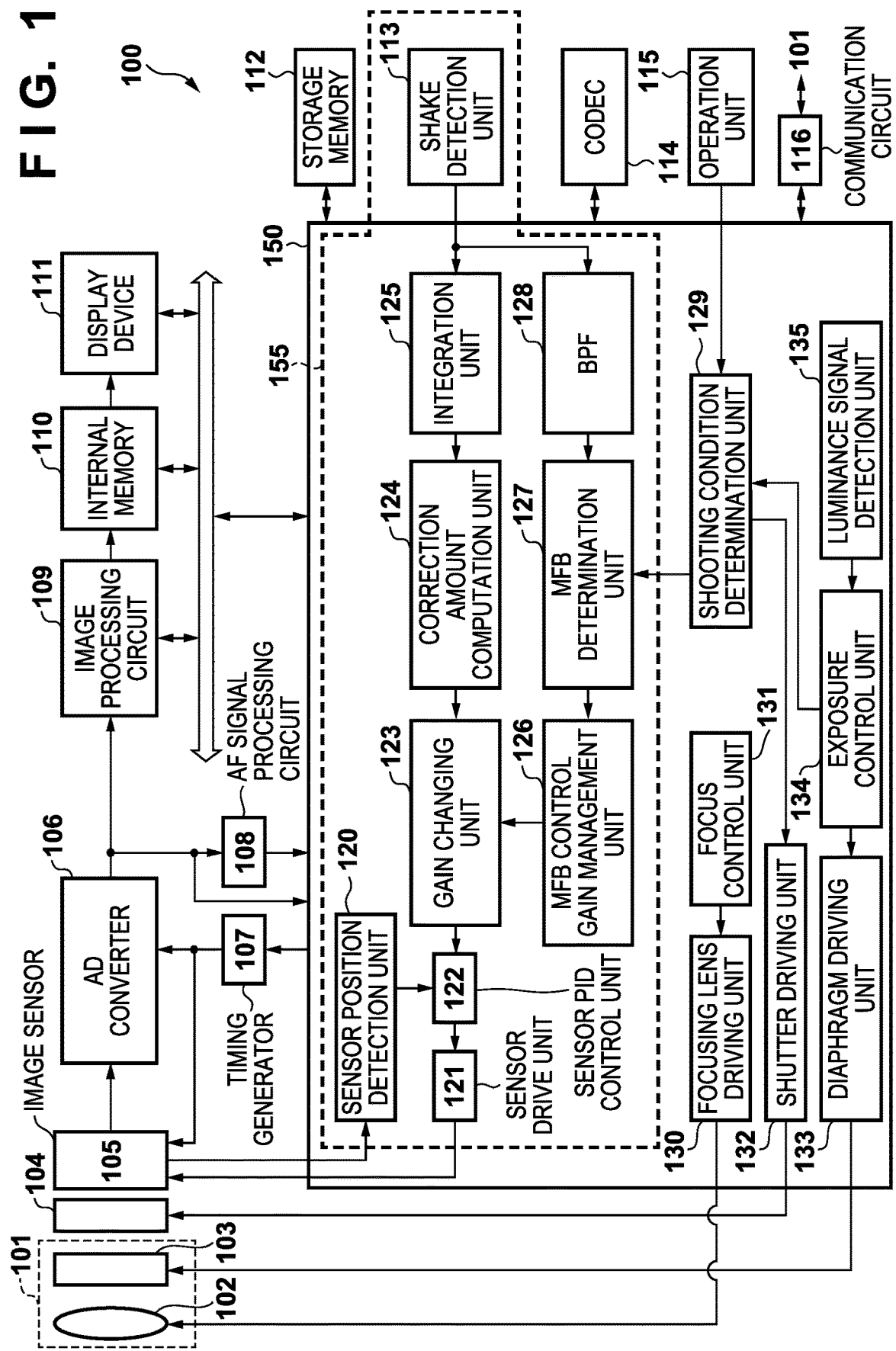
FIG. 1 is a block diagram showing an exemplary configuration of a digital camera, which is one example of an image capture apparatus to which a stabilization apparatus according to an embodiment is applicable.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiment will be described in relation to a case where the present invention is embodied on an interchangeable lens digital camera. However, the present invention can be embodied on arbitrary electronic devices that have an image capture function. Such electronic devices include a video camera, a computer device (e.g., a personal computer, a tablet computer, a media player, and a PDA), a mobile telephone device, a smartphone, a game device, a robot, a drone, and a driving recorder. These are examples, and the present invention can be embodied on other electronic devices as well.

FIG. 1 is a block diagram showing an exemplary functional configuration of an interchangeable lens digital camera 100 (hereinafter referred to as a camera 100) on which an image stabilization apparatus according to the embodiment of the present invention can be embodied. An attachable and detachable lens unit 101 is mounted on the camera 100. The lens unit 101 may be fixed to the camera 100.

Although the lens unit 101 includes a plurality of lenses, only a focusing lens 102 is shown in FIG. 1. Also, in a case where a correction lens is used as a blurring correction mechanism, the correction lens is also included in the lens unit 101. A diaphragm 103 is a mechanical diaphragm that can adjust an aperture size. A mechanical shutter 104 (hereinafter referred to as a shutter 104) controls exposure of an image sensor 105. The shutter 104 and an electronic shutter may be used in combination, or only an electronic shutter may be used without using the shutter 104.

The lens unit 101 forms an optical image of a subject on the image sensor 105. The image sensor 105 includes a pixel array in which a plurality of pixels that each include a photoelectric conversion unit are arranged two-dimensionally. The image sensor 105 converts the optical image of the subject into a group of pixel signals (analog image signals). The image sensor 105 may be a known CCD or CMOS image sensor.

In the present embodiment, the image sensor 105 supports automatic focus detection based on an image plane phase-difference detection method (phase-difference AF), and is capable of outputting a pair of signals that is used in deriving a defocus amount in phase-difference AF.

In the present embodiment, the image sensor 105 is configured to be, for example, movable in two directions that are perpendicular to the optical axis, and the image sensor 105 and a driving circuit therefor function as a correction mechanism in the image stabilization apparatus. Note that the image sensor 105 may also be movable in other directions, such as the direction of rotation around the optical axis.

A camera control unit 150 includes one or more processors (a CPU, an MPU, and the like) that can execute a program. The camera control unit 150 realizes various types of functions of the camera 100 by reading the program stored in, for example, a storage memory 112 into an internal memory 110 and executing the program, thereby controlling the operations of the camera 100 and the lens unit 101. The functions realized by the camera control unit 150 include, for example, image blurring correction control, automatic exposure (AE) control, AF control, and so on.

FIG. 1 depicts a part of the functions realized by the camera control unit 150 as function blocks 120 to 135. Therefore, in practice, the matters that are described as the operations of the function blocks 120 to 135 are realized by the camera control unit 150 executing the program. Also, one or more of the function blocks 120 to 135 may be realized by hardware that is different from the camera control unit 150. Note that the image stabilization apparatus according to the present embodiment includes constituent elements indicated by 155.

The storage memory 112 is, for example, a rewritable nonvolatile memory, and stores the program that can be executed by the camera control unit 150, various types of setting values, GUI data, and so on.

The internal memory 110 is, for example, a volatile memory, and is used to read in the program executed by the camera control unit 150 and store values that are necessary during the execution of the program. Also, a partial region of the internal memory 110 is used as a video memory for a display apparatus 111.

In a case where the lens unit 101 is attachable and detachable, the camera control unit 150 communicates with a non-illustrated lens control unit included in the lens unit 101 via a communication unit 116. The camera control unit 150 controls driving of the focusing lens 102 and the diaphragm 103, and obtains information of the lens unit 101, via communication with the lens unit 101. The details of the operations of the camera control unit 150 will be described later.

An AD converter 106 generates digital image signals by applying noise removal processing, gain adjustment processing, and AD conversion processing to the analog image signals that have been read out from the image sensor 105. The AD converter 106 outputs the generated digital image signals to the camera control unit 150, an AF signal processing circuit 108, and an image processing circuit 109.

Under control of the camera control unit 150, a timing generator 107 controls driving timings of the image sensor 105 and output timings of the AD converter 106.

The AF signal processing circuit 108 generates a pair of image signals (an A image signal and a B image signal) for phase-difference AF from the digital image signals output from the AD converter 106. The AF signal processing circuit 108 alleviates the influence of noise by applying summation and averaging processing to the generated pair of image signals, and then extracts signal components of a predetermined frequency band by applying filter processing. Furthermore, the AF signal processing circuit 108 calculates the amount of displacement (phase difference) between signals that maximizes the correlation between signals after the filter processing, and outputs the amount of displacement to a focus control unit 131.

The focus control unit 131 converts the amount of displacement provided by the AF signal processing circuit 108 into a defocus amount. The focus control unit 131 outputs, to a focusing lens driving unit 130, a driving direction and a driving amount of the focusing lens 102 based on the defocus amount. The focusing lens driving unit 130 drives the focusing lens 102 in accordance with the driving direction and the driving amount provided by the focus control unit 131. Note that in a case where the lens unit 101 is interchangeable, the lens unit 101 may be notified of the driving direction and the driving amount of the focusing lens 102 via the communication unit 116 so that the lens unit 101 controls driving of the focusing lens 102.

The image processing circuit 109 generates digital image signals to be recorded and/or displayed by applying, for example, color interpolation processing and correction processing to the digital image signals output from the AD converter 106. The image processing circuit 109 stores the digital image signals to be recorded and/or displayed into the internal memory 110. The color interpolation processing is processing for interpolating the values of color components that are not obtained at the time of shooting, and is also referred to as demosaicing processing and synchronization processing. Also, the correction processing includes white balance adjustment, tone correction (gamma processing), processing for correcting the influence of optical aberration and vignetting of the lens unit 101, processing for correcting colors, and so on. Note that these are examples of image processing that can be applied by the image processing circuit 109, and do not limit image processing applied by the image processing circuit 109.

The image processing circuit 109 composites together the digital image signals to be displayed on the display apparatus 111 and an image indicating information of the camera 100, and stores the result of the composition into a video memory region of the internal memory 110. The display apparatus 111 displays an image based on the image signals stored in the video memory region of the internal memory 110. The display apparatus 111, for example, may be a monitor fixed to a housing of the camera 100, or may be a vari-angle monitor which is joined to the housing via an arm or a hinge and which is variable in terms of the angle and orientation.

A codec 114 generates encoded image data by applying encoding processing to digital image signals stored in the internal memory 110. Also, the codec 114 applies decoding processing to encoded image data stored in the internal memory 110, thereby converting the same into digital image signals.

An operation unit 115 is a collective term for a group of input devices that are intended for a user to input an instruction with respect to the camera 100. The operation unit 115 can include a release button, a shooting mode switching dial, a moving image shooting button, a shooting mode/reproduction mode switching button, direction keys, a confirmation button, a menu button, and so forth. In a case where the display apparatus 111 is a touchscreen display, the display apparatus 111 also functions as the operation unit 115.

A shake detection unit 113 detects a motion of the camera 100. The shake detection unit 113 is, for example, a gyroscope sensor (hereinafter referred to as a gyroscope), and detects angular velocities around, for example, three axes that are perpendicular to one another, including the optical axis direction and the vertical direction of the camera 100.

A sensor driving unit 121 drives a moving mechanism of the image sensor 105.

A sensor position detection unit 120 detects the position of the image sensor 105. No limitation is intended regarding a method of detecting the position of the image sensor 105; for example, it is permissible to use known methods, such as a magnetism-based method that uses magnets and Hall sensors, and an optical method that uses light-receiving units and light-receiving sensors. Here, it is assumed that the image sensor 105 has a moving mechanism with which the image sensor 105 can move in the direction perpendicular to the optical axis.

A sensor PID control unit 122 performs feedback control (e.g., PID control (proportional control, integral control, and derivative control)) with respect to the sensor driving unit 121 so as to bring the deviation between a target position of the image sensor 105 and a current position detected by the sensor position detection unit 120 close to 0. As the PID control is a known technique, a detailed description thereof is omitted.

A luminance signal detection unit 135 generates luminance information used in automatic exposure control (AE) from the digital image signals output from the AD converter 106.

An exposure control unit 134 decides on exposure conditions (a shutter speed, a diaphragm value, and the like) based on the luminance information obtained by the luminance signal detection unit 135. The exposure control unit 134 notifies a shutter driving unit 132, a diaphragm driving unit 133, and a shooting condition determination unit 129 of the decided exposure conditions.

The shutter driving unit 132 drives the shutter 104 in accordance with the shutter speed of which it has been notified by the exposure control unit 134. The diaphragm driving unit 133 drives the diaphragm 103 in accordance with the diaphragm value of which it has been notified by the exposure control unit 134. Note that in a case where the lens unit 101 is interchangeable, the lens unit 101 may be notified of the diaphragm value via the communication unit 116, and the lens unit 101 may control driving of the diaphragm 103. The exposure control unit 134 also controls a gain that is applied to the analog image capture signals that have been read out from the image sensor 105.

Next, a description is given of the decision of the target position of the image sensor 105. The angular velocity detected by the shake detection unit 113 can be converted into an angle by integrating the same using an integration unit 125. As the angle obtained by the integration unit 125 is minute, it can be converted into a position by multiplying the same by a constant. In this way, the target position of the image sensor 105 can be decided on in accordance with the angular velocity detected by the shake detection unit 113.

A correction amount computation unit 124 calculates a shake correction amount by multiplying the value output from the integration unit 125 by lens sensitivity information that has been obtained from the lens unit 101 via the communication unit 116. The lens sensitivity information is a value that changes depending on the focal length and the focus distance of the lens unit 101. Therefore, multiplication by the lens sensitivity information that conforms with the state of the lens unit 101 makes it possible to improve the accuracy of the shake correction amount for moving the image sensor 105 to the target position.

A gain changing unit 123 changes a control gain in the sensor PID control unit 122 based on the shake correction amount calculated by the correction amount computation unit 124, and on an amount of change in the control gain of which it is notified by an MFB gain management unit 126. The gain changing unit 123 can change the control gain by, for example, adding a constant corresponding to the amount of change in the control gain to the deviation on which feedback control is performed by the sensor PID control unit 122. If the control gain during feedback is increased, the tracking property of feedback control is increased and the image stabilization effects are enhanced, but sensitivity to a disturbance is also increased. On the other hand, if the control gain during feedback is reduced, the tracking property of feedback control is reduced and the image stabilization effects are lowered, but sensitivity to a disturbance is also reduced.

As stated earlier, in a movable member that is joined to the housing via a hinge or an arm, such as a vari-angle monitor, and in an external accessary that is attachable to and detachable from a hot shoe of the housing, a portion that is connected to the housing has a spring-like nature (a spring element). In a specific lens unit (e.g., an interchangeable lens that has a total length and/or a weight equal to or larger than a threshold(s)), too, a lens mount portion has a spring element.

Figure 2:
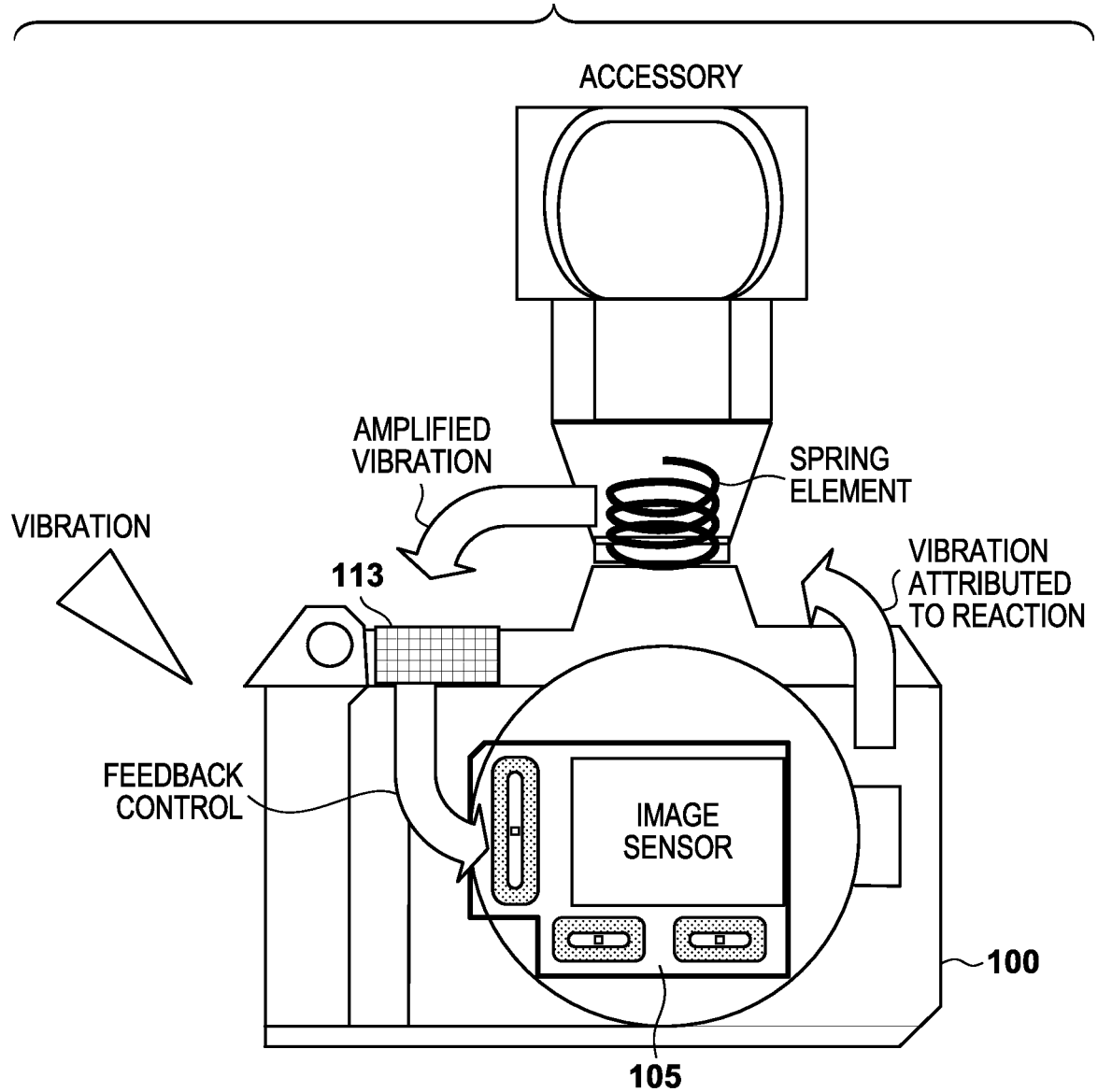
FIG. 2 is a schematic diagram showing the principle of the occurrence of mechanical feedback.

FIG. 2 schematically shows a state where an external flash has been attached to a hot shoe of the camera 100. A spring element amplifies a vibration attributed to the reaction that is generated when the image blurring correction mechanism (image sensor 105) is moved in accordance with the angular velocity detected by the shake detection unit 113. Once the amplified vibration has been detected by the shake detection unit 113 as a motion of the camera 100, the image blurring correction mechanism is moved in order to reduce the vibration. When the reaction of the movement of the image sensor 105 has been amplified by the spring element and detected by the shake detection unit 113 in the foregoing manner, a phenomenon occurs in which feedback control continues without being concluded (mechanical feedback (MFB)). MFB occurs even when feedback control is stable, and causes an image obtained through shooting to be blurry, thereby lowering the sharpness of the image.

Figure 3:
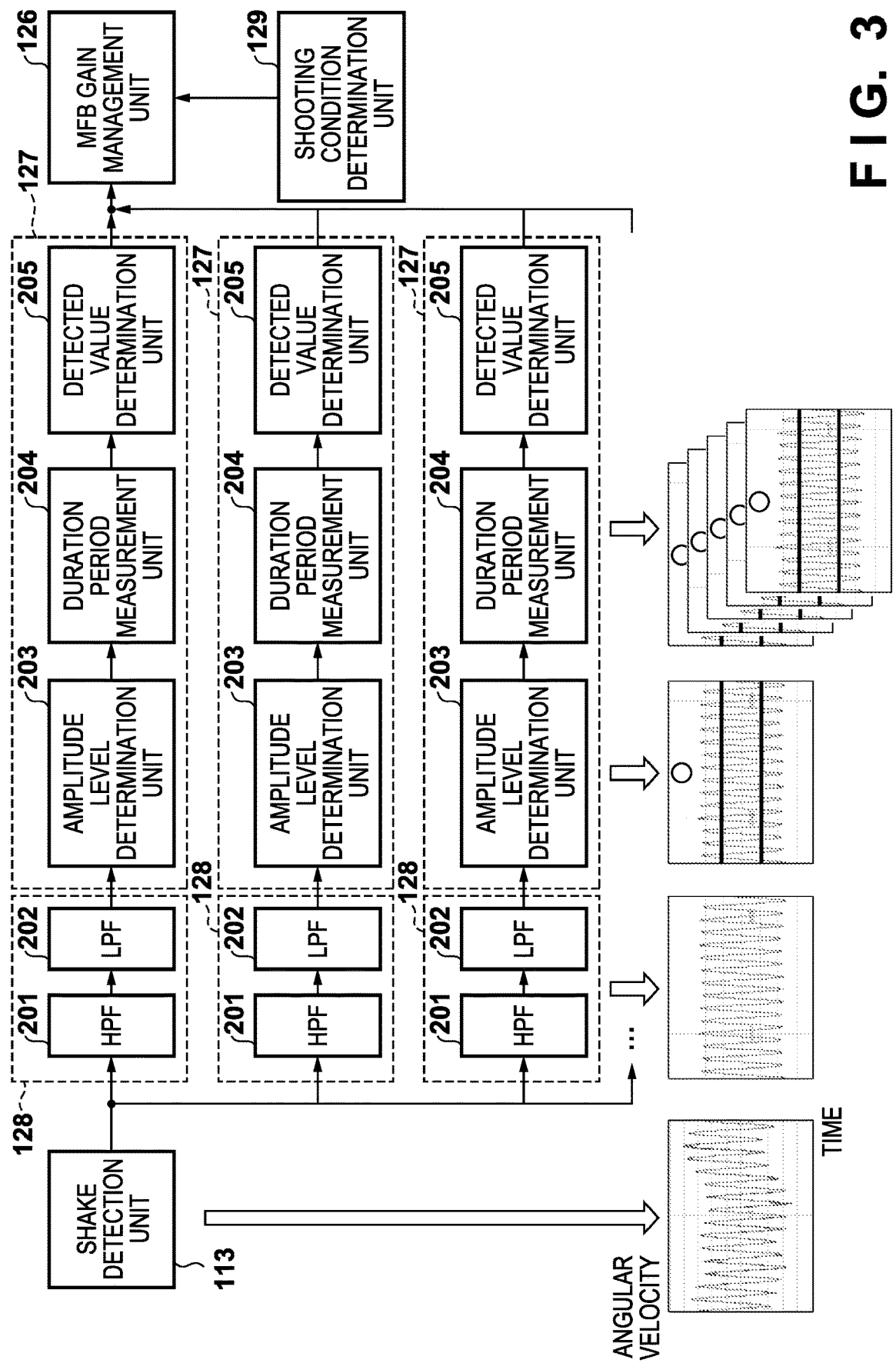
FIG. 3 is a diagram related to processing for detecting mechanical feedback.

FIG. 3 is a diagram for describing the configuration and operations of the image stabilization apparatus according to the present embodiment. Here, it is assumed that MFB has been occurring on the camera 100. Also, the graphs in a lower portion of FIG. 3 schematically show how the angular velocity signals output from the shake detection unit 113 are handled in the course of processing, and the horizontal axis and the vertical axis therein represent time and the angular velocity, respectively.

The shake detection unit 113 inputs the angular velocity signals (shake data), which have a predetermined data rate, to band-pass filters (BPFs) 128. The band-pass filters 128 can be realized by a combination of a high-pass filter (HPF) 201 and a low-pass filter (LPF) 202. The BPFs 128 are filters that extract frequency components of MFB. The frequency of MFB coincides with the resonant frequency, which is determined by the natural frequency that depends on a spring constant of an attachment portion of an external accessary or a movable member. The resonant frequency changes in accordance with the types and the number of external accessories and movable members. Therefore, with use of a plurality of band-pass filters 128 that have different passbands, resonant frequency components are extracted for each of combinations of the types and the number of external accessories and movable members.

Note that the frequency of MFB is higher than a first frequency of a vibration of the camera 100 caused by a camera shake (equal to or lower than 15 Hz), and is equal to or higher than 50 Hz, for example. Therefore, the passbands of the band-pass filters 128 are frequency bands that are higher than the passband for detecting the vibration of the camera 100 caused by a camera shake.

Note that the frequency of triggered MFB can also be specified by causing a user to input information indicating the open or closed state of the vari-angle monitor, the type of an existing external accessory, the type of the lens unit 101, and the like, or by automatically detecting such information. In a case where the frequency of MFB can be specified, only a band-pass filter 128 that extracts components of the specified frequency may be used. Also, the number of the band-pass filters 128 may be reduced by using variable band-pass filters, instead of preparing the plurality of band-pass filters 128 with fixed passbands.

MFB determination units 127, which include an amplitude level determination unit 203, a duration period measurement unit 204, and a detected value determination unit 205, are provided in correspondence with the band-pass filters 128, respectively.

The amplitude level determination unit 203 calculates a frequency based on the number of times the angular velocity of the frequency components of MFB output by the BPF 128 has exceeded a predetermined threshold and the number of times the angular velocity has fallen below a predetermined threshold. The operations of the amplitude level determination unit 203 are not described using FIGS. 4A and 4B.

FIG. 4A shows an example of an output signal from the band-pass filter 128. Due to the band-pass filter 128, the output signal includes few noise components (frequency components other than the frequency components of MFB to be extracted). Therefore, the frequency of MFB can be calculated with high accuracy based on the number of times the angular velocity has exceeded an upper threshold and the number of times the angular velocity has fallen below a lower threshold within a certain period (they can be rephrased as the lengths of the periods in which the angular velocity has exceeded and fallen below the upper threshold). Here, it is assumed that the upper threshold and the lower threshold have the same absolute value but have different signs. Also, the upper threshold and the lower threshold used by the amplitude level determination unit 203 can have different values depending on the frequency components extracted by the corresponding band-pass filter 128.

On the other hand, FIG. 4B shows an example of an angular velocity signal (e.g., an output signal from the shake detection unit 113) for a case where the band-pass filters 128 are not applied. In this case, the angular velocity signal includes a large amount of noise components. Therefore, the accuracy of the frequency of MFB that has been calculated based on the number of times the angular velocity has exceeded the upper threshold and the number of times the angular velocity has fallen below the lower threshold within the certain, predetermined period, is lower than that of the case of FIG. 4A.

For example, assume that the total of the number of times the angular velocity has exceeded the upper threshold and the number of times the angular velocity has fallen below the lower threshold within 200 ms is equal to or larger than 15, and the length of the period in which the angular velocity has exceeded the upper threshold and the period in which the angular velocity has fallen below the lower threshold is equivalent to 95 Hz to 105 Hz. In this case, the amplitude level determination unit 203 determines 100 Hz as a candidate for the frequency of MFB. Note that such values as the upper threshold, the lower threshold, 200 ms, and 15 (times), are set in advance.

Returning to FIG. 3, the duration period measurement unit 204 determines whether the candidate for the frequency determined by the amplitude level determination unit 203 has continued for a predetermined period or a predetermined number of times. For example, assume that the amplitude level determination unit 203 determines the candidate for the frequency of MFB every 200 ms. In this case, the duration period measurement unit 204 determines whether the amplitude level determination unit 203 has determined the same frequency candidate five times in a row (this candidate has continued for one second). Note that the predetermined period or the predetermined number of times that is used in the determination of the duration period measurement unit 204 is set in advance.

When the duration period measurement unit 204 has determined that the amplitude level determination unit 203 has determined the same frequency candidate five times in a row (this candidate has continued for one second), the detected value determination unit 205 determines that MFB of this frequency has been occurring. In a case where there are a plurality of detected value determination units 205 as shown in FIG. 3, it may be determined that MFBs of different frequencies have been occurring concurrently.

The MFB gain management unit 126 decides on an amount of change in the control gain in accordance with the frequency of MFB determined by the detected value determination unit 205, and notifies the gain changing unit 123 of the same. When MFB has been occurring, the MFB gain management unit 126 reduces the control gain during feedback compared to when MFB has not been occurring; in this way, sensitivity to a disturbance is reduced, and the influence of MFB on feedback control is reduced. Also, the MFB gain management unit 126 changes an amount of reduction in the control gain in accordance with the frequency of MFB that has been occurring (the details will be described later). This can reduce a minute vibration of the camera 100 attributed to MFB, hence a decrease in the sharpness of an image obtained through shooting.

The shooting condition determination unit 129 provides the MFB gain management unit 126 with a notification indicating that the control gain is prohibited from being changed in a case where the operation unit 115 has switched between a still image shooting mode and a moving image shooting mode, and also during exposure or during continuous shooting for still image shooting. This is for restoring the control gain to an initial value in the case of switching between the still image shooting mode and the moving image shooting mode. Also, this is because there is a risk that image blurring correction will be insufficient if the control gain is changed during shooting of a still image.

Figure 5:
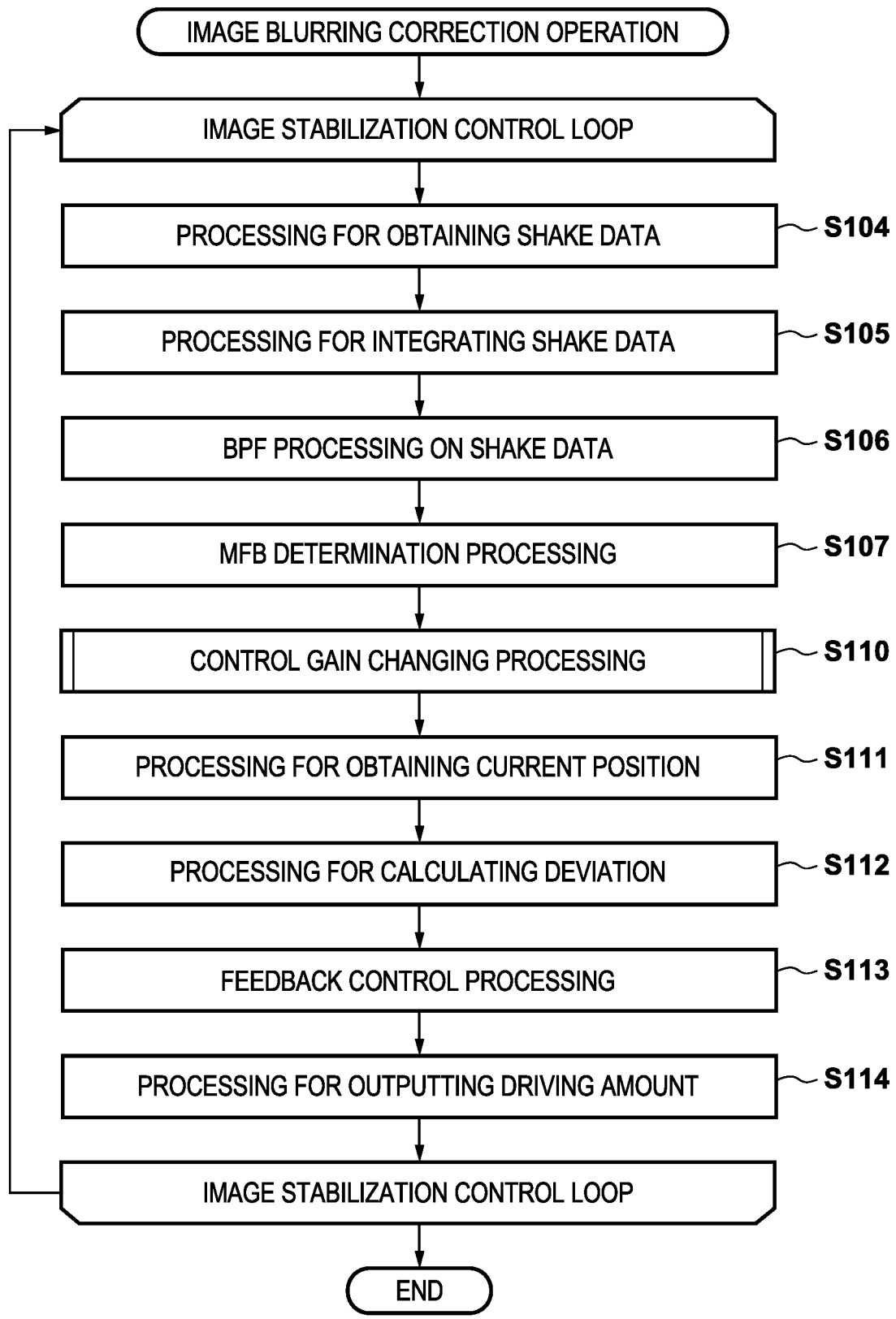
FIG. 5 is a flowchart related to the image blurring correction operations according to the embodiment.

FIG. 5 is a flowchart related to image blurring correction operations that are implemented by the camera control unit 150 that acts as the image stabilization apparatus. The image blurring correction operations are executed cyclically when image blurring correction has been enabled on the camera 100. In FIG. 5, processing of steps S104 to S114 that is executed cyclically as the image blurring correction operations is depicted as an image stabilization control loop.

In step S104, the camera control unit 150 obtains an angular velocity signal (shake data) output from the shake detection unit 113. The camera control unit 150 may temporarily store the obtained angular velocity data into the internal memory 110. The obtained shake data is input to the integration unit 125 and the BPFs 128.

Although FIG. 5 shows that processing of steps S105 to S109 is executed in series, processing of step S105 and processing of steps S106 and S107 can be executed in parallel. Note that although it is assumed here that two types of frequency components are extracted using three BPFs 128 that have different passbands, no limitation is intended regarding the number of frequency components to be extracted.

In step S105, the camera control unit 150 integrates the shake data with use of the integration unit 125, thereby converting the same into angular data.

In step S106, the camera control unit 150 implements BPF processing by applying each individual BPF 128 to the shake data.

In step S107, with respect to the frequency components that have been extracted by each individual BPF 128, the camera control unit 150 determines whether MFB has been occurring with use of the amplitude level determination unit 203, the duration period measurement unit 204, and the detected value determination unit 205 as stated earlier.

In step S110, the camera control unit 150 executes control gain changing processing. The details of the control gain changing processing will be described later using FIG. 6.

In step S111, the camera control unit 150 obtains the current position of the image sensor 105 with use of the sensor position detection unit 120.

In step S112, the camera control unit 150 calculates the deviation between the current position obtained in step S111 and a target position that has been calculated based on the result of integration processing in step S105.

In step S113, the camera control unit 150 provides the sensor PID control unit 122 with the deviation calculated in step S112, thereby executing feedback control processing related to the movement of the image sensor 105.

In step S114, the camera control unit 150 outputs, to the sensor driving unit 121, a driving amount that has been decided on by the sensor PID control unit 122 in accordance with the deviation.

Next, the details of the control gain changing processing implemented in step S110 will be described using a flowchart shown in FIG. 6.

In step S202, the shooting condition determination unit 129 determines whether an image capture mode has been switched from one of a still image mode and a moving image mode to another; step S203 is executed when it has been determined that the image capture mode has been switched, and step S204 is executed when it has not been thus determined.

In step S203, the camera control unit 150 determines whether MFB had occurred in the shooting mode before the switching. When it has been determined that MFB had occurred in the shooting mode before the switching, step S210 is executed; when it has not been thus determined, the control gain changing processing is ended without changing the control gain. The control gain can vary due to the difference in the characteristics of image stabilization control between the still image mode and the moving image mode. In a case where the shooting mode has been switched, if MFB had not occurred before the switching, there is no need to restore the control gain because the control gain was not changed when the shooting mode was switched previously. On the other hand, if MFB had occurred before the switching, the control gain was changed after the shooting mode was switched previously. Therefore, in step S210, the camera control unit 150 changes the control gain to an initial value in the shooting mode that follows the switching, and ends the control gain changing processing.

Figure 7:
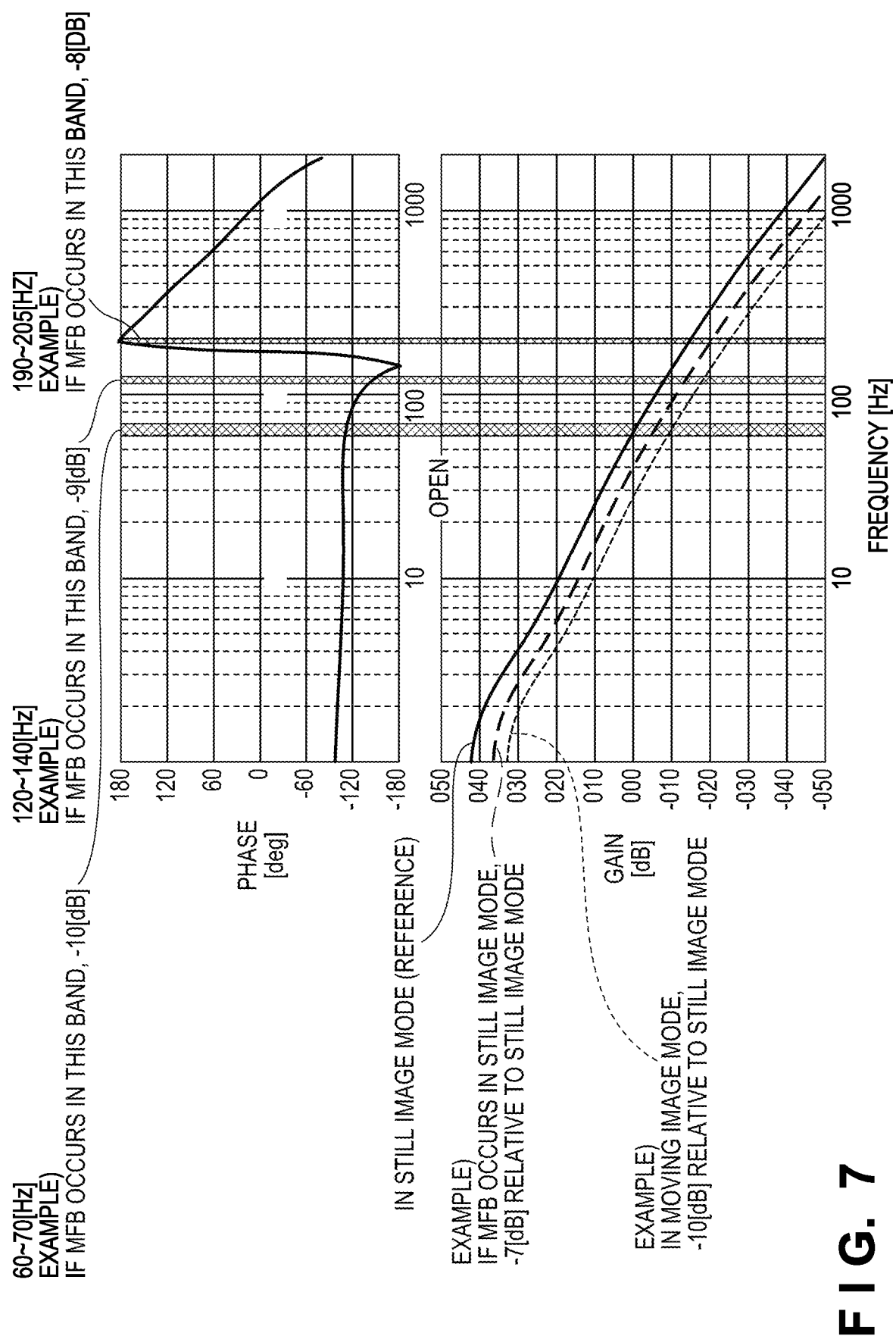
FIG. 7 is a Bode plot related to an example of PID control according to the embodiment.

FIG. 7 is a Bode plot related to one example of control on the control gain according to the present embodiment. In the Bode plot of FIG. 7, a phase plot is depicted in the upper part, and a gain plot is depicted in the lower part. In the phase plot, the horizontal axis represents frequencies [Hz], and the vertical axis represents phases [deg]. Also, in the gain plot, the horizontal axis represents frequencies [Hz], and the vertical axis represents gains [dB]. The frequencies along the horizontal axes are the same between both plots.

In the gain plot of FIG. 7, it is assumed that the control gain of a case where MFB has not occurred in the still image mode, which is indicated by a solid line, is the reference, and the control gain of the moving image mode indicated by a dot line is −10 [dB] relative to the reference. Upon switching from the still image mode to the moving image mode in a state where MFB has occurred in the still image mode and the control gain has been reduced to −7 [dB] relative to the reference as indicated by a dash line, a further reduction corresponding to −3 [dB] is applied to the control gain in step S210. As a result, the control gain becomes −10 [dB] relative to the reference, and can be restored to an initial value in the moving image mode.

Returning to FIG. 6, in a case where it has not been determined that the shooting mode has been switched in step S202, the shooting condition determination unit 129 determines whether exposure or continuous shooting is currently performed in the still image mode in step S204. When it has been determined that exposure or continuous shooting is currently performed in the still image mode, the camera control unit 150 ends the control gain changing processing without changing the control gain. This is because, if the control gain is changed during exposure or during continuous shooting, there is a risk that the image quality will be influenced, and the image quality will vary among images that have been continuously shot.

When it has not been determined that exposure or continuous shooting is currently performed in the still image mode in step S204, the camera control unit 150 determines, in step S205, whether a predetermined period has elapsed since MFB was determined to have occurred most recently. In a case where it has not been determined that the predetermined period has elapsed since MFB was determined to have occurred most recently, and in a case where it has not been determined that MFB has occurred, the camera control unit 150 ends the control gain changing processing without changing the control gain. On the other hand, in a case where it has been determined that the predetermined period has elapsed since MFB was determined to have occurred most recently, the camera control unit 150 executes step S206.

In step S206, the camera control unit 150 determines whether it has been determined that MFB has occurred in step S107 or S109. When it has not been determined that MFB has occurred, the camera control unit 150 ends the control gain changing processing without changing the control gain. On the other hand, when it has been determined that MFB has occurred in step S107 or S109, the camera control unit 150 executes step S207.

In step S207, the camera control unit 150 decides on an amount of change in an MFB gain with use of the MFB gain management unit 126. The MFB gain management unit 126 decides on an amount of change in the gain corresponding to the frequency of MFB that has been determined to have been occurring by the MFB determination unit(s) 127. For example, assume that two band-pass filters 128 have passbands of 60 to 70 Hz, 120 to 140 Hz, and 190 to 205 Hz shown in FIG. 7.

Also assume that the amount of change in the gain corresponding to the frequency of MFB is as follows.

In a case where it has been determined that MFB with a frequency of 60 to 70 Hz has been occurring: −10 [dB]

In a case where it has been determined that MFB with a frequency of 120 to 140 Hz has been occurring: −9 [dB]

In a case where it has been determined that MFB with a frequency of 190 to 205 Hz has been occurring: −8 [dB]

In a case where one MFB determination unit 127 has determined that MFB has been occurring, the MFB gain management unit 126 decides on an amount of change in the gain corresponding to the frequency of MFB. On the other hand, in a case where a plurality of MFB determination units 127 have determined that MFB has been occurring, the largest one of the amounts of change in the gain corresponding to the frequencies of MFB is decided on. For example, in a case where it has been determined that MFB has been occurring in all of the three frequency bands mentioned above, the MFB gain management unit 126 decides on −10 [dB] as the amount of change in the gain.

In step S209, the camera control unit 150 changes the control gain in the sensor PID control unit 122 with use of the gain changing unit 123 so that the control gain reflects the amount of change in the gain notified by the MFB gain management unit 126, and ends the control gain changing processing.

According to the present embodiment, it is possible to reduce a continuous minute vibration of an image capture apparatus that occurs when a vibration of the image capture apparatus attributed to the reaction of the movement of the blurring correction mechanism has been amplified by resonance (mechanical feedback: MFB). Specifically, in a case where the occurrence of MFB has been detected, MFB can be reduced by reducing the control gain in feedback control that controls the movement of the blurring correction mechanism. Also, the effects of image stabilization related to a camera shake and reduction of MFB can be balanced by using different amounts of reduction in the control gain in accordance with the frequency of MFB.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-148081, filed on Sep. 10, 2021, which is hereby incorporated by reference herein in its entirety.

What is claimed is:

1. An image stabilization apparatus that reduces image blurring by moving a correction mechanism in accordance with a motion of an image capture apparatus, the image stabilization apparatus comprising one or more processors that execute a program and thereby function as:
   a control unit configured to control a movement of the correction mechanism in accordance with a target position of the correction mechanism, the target position being intended to reduce the image blurring;
   a detection unit configured to detect a vibration of a preset frequency included in the motion, the preset frequency being higher than a first frequency of a vibration caused by a camera shake; and
   a changing unit configured to, in a case where the vibration of the preset frequency has been detected, reduce a control gain used for controlling the movement of the correction mechanism compared to a case where the vibration of the preset frequency has not been detected.

2. The image stabilization apparatus according to claim 1, wherein
   the preset frequency is a frequency higher than 15 Hz.

3. The image stabilization apparatus according to claim 1, wherein
   the preset frequency is based on a resonant frequency of a member that has been attached to the image capture apparatus.

4. The image stabilization apparatus according to claim 3, wherein
   a portion by which the member and the image capture apparatus are connected has a spring-like nature.

5. The image stabilization apparatus according to claim 3, wherein
   the member is a movable member that is attached to a housing of the image capture apparatus via a hinge or an arm.

6. The image stabilization apparatus according to claim 3, wherein
   the member is an external accessory that is attachable to and detachable from the image capture apparatus.

7. The image stabilization apparatus according to claim 1, wherein
   the detection unit detects the vibration of the preset frequency based on the number of times an angular velocity of the image capture apparatus exceeds a threshold and the number of times the angular velocity falls below the threshold within a predetermined period.

8. The image stabilization apparatus according to claim 1, wherein
   in a case where an image capture mode of the image capture apparatus has been switched, the changing unit restores the control gain to an initial value corresponding to an image capture mode that follows the switching.

9. The image stabilization apparatus according to claim 8, wherein
   the image capture mode includes a still image mode and a moving image mode, and
   the initial value for the moving image mode is lower than the initial value for the still image mode.

10. The image stabilization apparatus according to claim 1, wherein
    the control gain is not changed during exposure or during continuous shooting for still image shooting.

11. The image stabilization apparatus according to claim 1, wherein
    the blurring correction mechanism includes an image sensor.

12. An image capture apparatus, comprising an image stabilization apparatus that reduces image blurring by moving a correction mechanism in accordance with a motion of an image capture apparatus, the image stabilization apparatus comprising:
    one or more processors that execute a program and thereby function as:
    a control unit configured to control a movement of the correction mechanism in accordance with a target position of the correction mechanism, the target position being intended to reduce the image blurring;
    a detection unit configured to detect a vibration of a preset frequency included in the motion, the preset frequency being higher than a first frequency of a vibration caused by a camera shake; and
    a changing unit configured to, in a case where the vibration of the preset frequency has been detected, reduce a control gain used for controlling the movement of the correction mechanism compared to a case where the vibration of the preset frequency has not been detected.

13. A method of controlling an image stabilization apparatus that reduces image blurring by moving a correction mechanism in accordance with a motion of an image capture apparatus, the method comprising:
    controlling a movement of the correction mechanism in accordance with a target position of the correction mechanism, the target position being intended to reduce the image blurring;
    detecting a vibration of a preset frequency included in the motion, the preset frequency being higher than a first frequency of a vibration caused by a camera shake; and
    in a case where the vibration of the preset frequency has been detected, reducing a control gain used for controlling the movement of the correction mechanism compared to a case where the vibration of the preset frequency has not been detected.

14. A non-transitory computer-readable medium storing therein a program for causing a computer in an image stabilization apparatus that reduces image blurring by moving a correction mechanism in accordance with a motion of an image capture apparatus, to function as:
    a control unit configured to control a movement of the correction mechanism in accordance with a target position of the correction mechanism, the target position being intended to reduce the image blurring;

a detection unit configured to detect a vibration of a preset frequency included in the motion, the preset frequency being higher than a first frequency of a vibration caused by a camera shake; and a changing unit configured to, in a case where the vibration of the preset frequency has been detected, reduce a control gain used for controlling the movement of the correction mechanism compared to a case where the vibration of the preset frequency has not been detected.

* * * * *